April 21, 1970 K. H. STEFAN 3,507,462
BALLOON LAUNCHING METHOD AND APPARATUS
Filed Nov. 9, 1967

INVENTOR.
KARL H. STEFAN
BY
Attorney

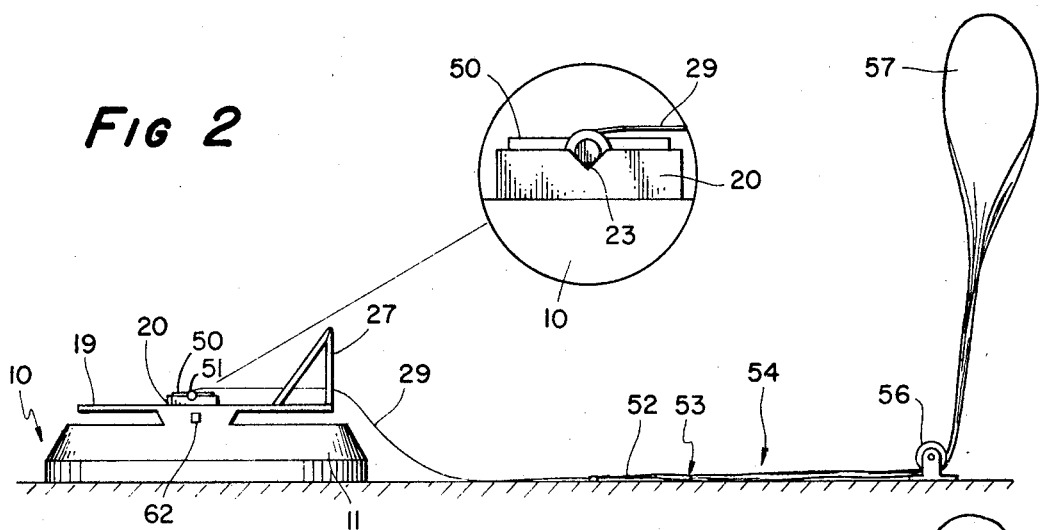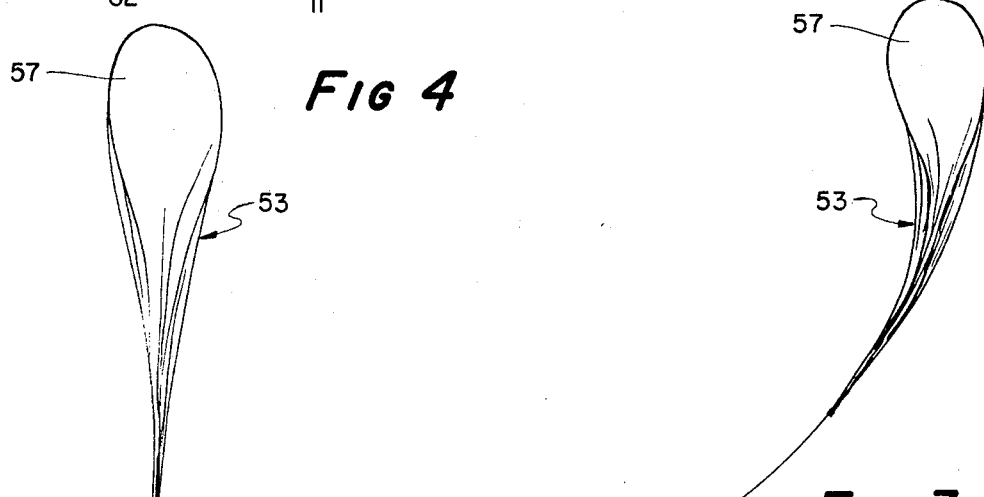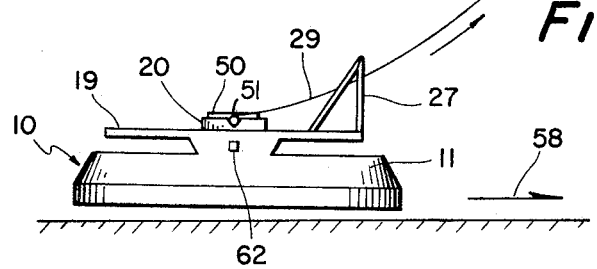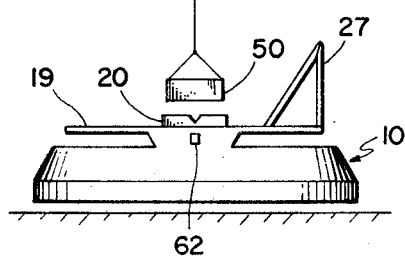

United States Patent Office 3,507,462
Patented Apr. 21, 1970

3,507,462
BALLOON LAUNCHING METHOD AND
APPARATUS
Karl H. Stefan, Boulder, Colo., assignor to Litton Systems, Inc., Beverly Hills, Calif., a corporation of Maryland
Filed Nov. 9, 1967, Ser. No. 681,877
Int. Cl. B64b 1/40
U.S. Cl. 244—31            9 Claims

ABSTRACT OF THE DISCLOSURE

This method and apparatus for launching high altitude balloons and payloads attached thereto by a lift line utilizes a ground-effect machine for supporting the payload during the balloon launching. Upon release for flight, the balloon produces forces on the lift line causing the ground-effect machine to move and positon the payload beneath the balloon. As the balloon rises, the payload is removed from the positioned ground-effect machine for flight.

BACKGROUND OF THE INVENTION

This invention relates in general to balloon launching, and in particular to a method and apparatus for launching balloons of the type frequently used, for example, in transporting meteorological or other payloads for investigating upper atmospheric conditions.

In the course of upper atmospheric investigations, a payload is transported from the surface of the earth upwardly into and through at least a portion of the earth's atmosphere. The payload may comprise apparatus for obtaining samples of atmospheric matter or, by way of additional example, apparatus for measuring such atmospheric variables as air pressure, electric charge, or the like. High altitude balloons have been found to be relatively simple and inexpensive devices for transporting payloads to the upper atmosphere.

A typical one of such balloons for carrying 300 pounds to a 125,000 foot altitude may have an uninflated length of 275 feet and may weigh 520 pounds. To facilitate launching from ground level, such a balloon is inflated with lifting gas until an initial launch "bubble" is contained in only the top portion of the balloon. The inflated top portion of the balloon typically has a 45-foot gore length, thus leaving the other 230 feet of uninflated balloon to be lifted into the air upon balloon launching. During ascent of the balloon to 125,000 feet, the initial launch "bubble" will expand 230 times its original volume and thus, will completely inflate the balloon to a 200-foot diameter. A balloon of this type is neceessarily made from lightweight materials to enable it to reach high altitudes.

Since such a balloon is quite large, cumbersome, and fragile, in its partially inflated condition at the time of launching, the launching of the balloon and its associated payload presents problems, particularly where significant surface winds prevail during the stages of balloon inflation and launching. This problem becomes particularly acute at the time when inflation of the balloon is virtually completed and the tether or other restraining device securing the balloon to the earth is about to be released. Since the balloon payload is typically positioned other than directly under the inflated portion of the balloon, the initial ascent of the balloon places a substantial lateral force on the payload. If the prevailing wind is downwind of the payload, then the force of the wind on the inflated portion of the balloon adds to this lateral force. Conversely, if the prevailing wind shifts or if the payload is upwind relative to the balloon, then the force of the wind against the balloon may cause the line connecting the balloon to the payload to become slack, with the likelihood that the line will become fouled or subject the payload to a rough jerking force when the line again becomes taut.

Numerous prior art techniques and devices have been proposed to alleviate or overcome this problem. One such technique, for example, involves the use of a truck upon which the payload is temporarily retained during the balloon inflation period. The connecting line between the payload and the balloon is generally laid out in front of the truck parallel with the direction of the prevailing wind. The top portion of the balloon is inflated and retained by a tether, and the uninflated portion remains lying on the ground. When the inflation of the top portion of the balloon has been completed and the tether is released, the driver of the truck then commences driving toward or away from the balloon, the object being to maintain only nominal tension in the connecting line and to position the payload directly beneath the balloon concurrently with the time that the connecting line and the uninflated portion becomes substantially vertical.

The foregoing balloon launching technique requires a substantially level area free from obstructions and bumps so that the truck may be driven in whatever lateral direction taken by the balloon upon its initial ascent without jarring the payload which typically is delicate. Moreover, since the inflated portion of the balloon rises quite rapidly immediately upon being untethered and before being subjected to the restraining force of the payload, the truck must be driven quite rapidly to position the payload beneath the balloon, thus giving rise to an operation which is hazardous both to ground personnel and to the truck driver, and which requires delicate control and skilled judgement to properly position the truck.

Other prior art techniques have been developed for launching balloons and payloads of this type. For example, in U.S. Patent 3,195,838, issued July 20, 1965, there is described a launching technique which requires the use of a second auxiliary balloon to aid in the pre-launch inflation of the balloon. The technique described therein thus requires an additional balloon to be provided and inflated, and also requires additional rigging and associated connections between the balloons and the payload.

SUMMARY OF THE INVENTION

Accordingly, it is an object of this invention to provide new and improved balloon launching methods and apparatus.

It is another object of this invention to provide a balloon launching method and apparatus that need not be used only in ground area readily traversable by wheeled vehicle.

It is a further object of this invention to provide a balloon launching method and apparatus for permitting unrestricted balloon payload movement relative to the ground as required during a balloon launch.

It is yet another object of this invention to provide a balloon launching method and apparatus for enabling omni-directional payload movement relative to the ground during a launch.

It is still a further object of this invention to provide a balloon launching method and apparatus utilizing a ground-effect machine as a payload support vehicle during a launch.

It is an additional object of this invention to provide a payload vehicle for balloon launches which will automatically properly position the payload beneath the balloon by the towing forces of the balloon itself and without any other control or guidance.

It is also an object of the present invention to provide proper motion over the ground for a balloon payload without shock or bumping of the payload.

With these and other objects in view, the balloon launching technique of this invention involves the use of a ground-effect machine (hereinafter abbreviated GEM) which is a vehicle operationally maintained at a small distance above the surface being traversed. The GEM is maintained above the surface by means of an air stream which is directed downwardly underneath the machine at a pressure higher than ambient and then flows outwardly between the underside of the machine and the surface to escape around the periphery of the machine. The GEM is used as a vehicle to support the payload during the balloon launching. In the launching process, when the top portion of the balloon is sufficiently inflated to form the launch bubble, the balloon is released and begins to rise. As the balloon rises, the uninflated portion of the balloon and the connecting lines impart a lateral force to the payload. The connecting line may be connected to the payload at a point above the payload-GEM combined center of gravity in which case the GEM will be tipped by the lateral force in the direction of the force. This "tipping" will result in a propulsive force being generated by the GEM which will act in the direction of the tipping and thus supplement the lateral acceleration produced directly by the lateral force from the connecting line. In response to the lateral force, the GEM and the payload contained thereon, move in the same direction to position the payload directly beneath the balloon at the time when the connecting line is substantially vertical. As the balloon exerts more lifting force on the payload, there is less payload weight supported by the GEM. Therefore, the GEM becomes more and more responsive to lateral control forces because of a decrease in inertia. With the line generally vertical, the payload is lifted from the GEM by the balloon to commence its airborne flight. In response to the payload lift-off, a suitable device stops the lateral movement of the GEM.

These and other objects of the present invention will become apparent upon reference to the following description of the preferred embodiments of the present invention and to the appended drawings illustrating such preferred embodiments.

DESCRIPTION OF THE DRAWINGS

FIG. 2 is a side elevation view of the apparatus of FIG. 1, showing the vehicle supporting the payload at the beginning of a balloon launch;

FIG. 3 is a side elevation view as in FIG. 2, showing the relative position of the vehicle and the balloon as the balloon ascends and causes the vehicle to position the payload under the balloon;

FIG. 4 is a side elevation view as in FIGS. 2 and 3 showing the payload removed from the vehicle at the conclusion of the balloon launch.

DESCRIPTION OF THE DISCLOSED EMBODIMENT

Figure 1:
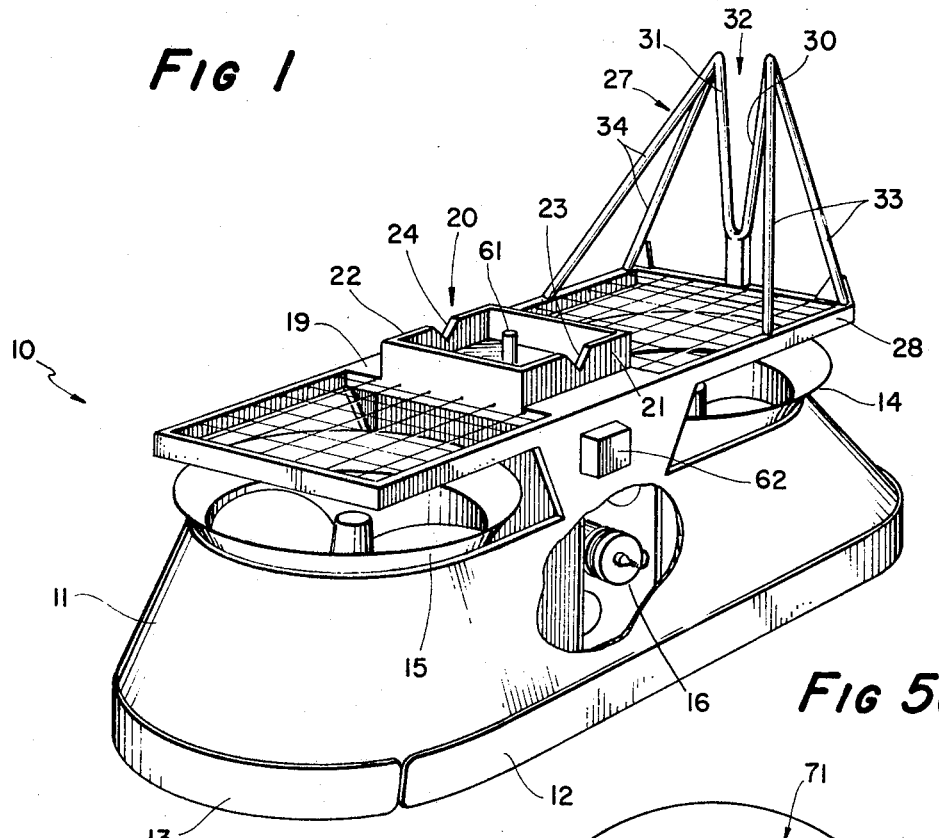
FIG. 1 is a perspective view of an embodiment of a payload supporting vehicle according to the present invention.

Referring now to the drawings, and in particular to FIG. 1 thereof, there is shown generally at 10 a ground-effect machine (GEM) adapted for practicing the present invention. Although the GEM 10 may be designed and constructed especially for the purpose of the balloon launching, it has been found that GEMs initially constructed for the more conventional purpose of transporting personnel or the like may be modified to provide the apparatus of the present invention. However, it should be noted that provision for horizontal propulsion is not necessary for this application of GEM-type vehicles. The GEM 10 described below is one that was actually used in experimental balloon launches. It is to be understood, however, that the GEM 10 and other GEM configurations could be used in accordance with the present invention to represent an optimum GEM design.

The depicted GEM 10 includes a body structure 11 having skirt members 12 and 13 positioned at the sides and ends, respectively, of the body. Positioned within the body is a forward fan 14 and an aft fan 15 for providing air pressure which develops the lift of the GEM 10. The fans 14 and 15 are powered either by individual engines or by a common engine 16. The pressurized air developed by the operation of the fans 14 and 15 flows along the underside of the GEM to provide lift which raises the GEM 10 from the ground. The air is discharged to the atmosphere beneath the skirts 12 and 13. Directional movement of the GEM will result from tipping the body structure 11 as shown in FIG. 3. The tipping changes the direction of a normally vertical reaction force on the GEM 10 and produces a horizontal force component. The GEM 10 tends to move horizontally in the direction of the horizontal force component.

Mounted on the body 11 of the GEM is a superstructure 19 generally defining a payload receptacle 20. The payload receptacle 20 in the depicted embodiment includes a pair of side members 21 and 22 spaced apart and mounted generally parallel with the longitudinal axis or longer side of the GEM 10. Each of side members 21 and 22 has a recess or notch 23 and 24, respectively, formed in the upper side thereof.

A guide structure 27 is rigidly secured at an end 28 of the GEM superstructure 19 for guiding a payload line 29 (FIGS. 2–4). The guide structure 27 (FIG. 1) includes a pair of upright members 30 and 31, each of which is tilted outwardly and symmetrically from a vertical plane to define a narrow V is a region 32 defined by the included angle between the upright members 30 and 31 and the superstructure 19 to laterally support the guide structure 27.

Turning now to FIG. 2, there is shown a side view of a balloon launching according to this invention. It can be seen that a payload 50 is placed in the receptacle 20 and is supported therein by a rod or other suitable transverse member 51 which is engaged in the recesses 23 and 24 on the side members 21 and 22. An uninflated portion 52 of a balloon 53 may be positioned on a ground cover (not shown) and extends toward a location 54 removed from the location of the GEM 10 in a desired wind direction relationship, such as downwind, with respect to the longitudinal axis of the GEM 10. The connecting line 29 is secured to the payloads 50 and the balloon 53 passes through the region 32 defined by the guide structure 27. The uninflated portion 52 of the balloon 53 is shown extending under a releasable roller 56 of a launch dolly to an inflated portion 57 (such as a launch bubble) of the balloon 53.

In the operation of the depicted embodiment, and as shown in FIG. 2, the inflation of the balloon 53 has been completed. The GEM engine 16 is started and the fans 14 and 15 lift the GEM body 11 and the payload 50 off the ground. At this time, and prior to the balloon launch, it may be desirable to anchor the GEM to prevent unnecessary wandering of the GEM. The roller 56 is then released to untether or release the balloon 53 from the ground location 54 as shown in FIG. 2. When the roller 56 is released, the inflated portion 57 of the balloon 53 commences to rise rather rapidly. The inflated portion 57 rises generally vertically with a lateral motion relative to the ground determined by the extent and direction of the wind, if any. The initial rise of the inflated portion 57 of the balloon 53 into the atmosphere produces tension on the connection line 29. Since the line 29 at this time is still substantially horizontal, this tension is transmitted to the payload 50 and through the rod 51 and the side members 21 and 22 to the GEM 10 as a substantially horizontal force tending to pull or tow the GEM in the direction indicated by an arrow 58 (FIG. 3). Moreover, since this towing force is, in one embodiment of the present invention, exerted on the GEM 10 at a point above the center of gravity thereof, this force also causes a tipping moment of the GEM in a clockwise direction as viewed in FIG. 3. This tipping moment, even though relatively slight, causes the air flow patterns from the underside of the GEM to change from the symmetrical condition present when the GEM is relatively motionless on level ground and generates the horizontal force component which tends to move the GEM 10 in the direction of the arrow 58 to cause the air flow patterns on the underside thereof to be restored to the symmetrical state. These forces on the GEM 10 in the direction indicated by arrow 58 accelerate the GEM 10 rather rapidly and brings the GEM and the payload 50 disposed thereon into alignment with the line of vertical flight of the balloon as shown in FIG. 4.

If a shift in the direction of the wind causes the balloon 53 to be deflected laterally from its initial path of ascent, or if the GEM 10 tends to deviate from a course of travel directly toward the generally vertical line of ascent of the balloon, then the line 29 contacts either of the upright members 31 or 30 and imparts to the GEM an additional lateral force tending to return the GEM to the desired course of travel. In this way, the GEM 10 travels along the shortest path which will bring the payload 50 substantially directly beneath the balloon 53 when the connecting line 29 is vertical, a condition depicted in FIG. 4.

As the balloon 53 ascends, the velocity of the GEM 10 is determined by the sum of the horizontal force imparted by the connecting line 29 parallel to the surface of the ground and the horizontal force component of the tipped GEM 10. Thus, as the balloon 53 continues to rise and the line 29 becomes more nearly vertical, the horizontal forces imparting horizontal motion to the GEM 10 decrease, and the velocity of the GEM similarly decreases. As shown in FIG. 4, when the GEM 10 and the payload 50 are directly beneath the balloon 53, the balloon 53 lifts the payload 50 from the receptacle 20 and the balloon flight continues unimpeded by the GEM 10 or any other ground apparatus.

Since the GEM 10 normally still has some forward motion at this time, it is desirable to provide some braking technique or apparatus responsive to the lift-off of the payload 50 to prevent further travel of the GEM. For example, a switch actuator 61 is provided in the receptacle 20. The presence of the payload 50 in the receptacle 20 maintains the actuator depressed for completing a control circuit 62 which may be mounted on the outside of the superstructure 19. When the payload 50 lifts off, the actuator 61 raises to the position shown in FIG. 1 to open the control circuit 63 to stop the engine 16 which drives the lift fans 14 and 15. As the engine 16 stops, the lift of the GEM decreases and the GEM settles to the ground.

Alternatively, apparatus (not shown) may be provided responsive to the lift-off of the payload 50 to operate the directional controls normally present on the GEM 10 in such a manner to counteract the prevailing GEM velocity at the time of lift-off. Further yet, a tether line (not shown) could be provided having sufficient length to permit freedom of movement of the GEM 10 during any normal launch operation, but which would restrain the GEM 10 from movement beyond this normal range and after the payload lift-off had occurred.

A balloon 53 and a payload 50 were launched with a vehicle similar to that depicted in FIGS. 1 and 2, including a GEM having a longitudinal dimension substantially greater than its transverse dimension, also generally as depicted in FIGS. 1 and 2. It was found that when the GEM was towed by a line secured to the GEM approximately 6 feet above the center of gravity thereof, the GEM 10 responded adequately to all reasonable tipping moments when the GEM was towed in a longitudinal direction. Moreover, the forward edge of the GEM 10 did not contact the ground, thus, undesirable digging-in of the GEM did not occur. Towing in the lateral direction, however, did produce some digging-in responsive to high accelerations induced by the towing. Accordingly, when the GEM 10 has a rectangular configuration, it is preferable to mount the guide structure 27 at the forward end 28 so that the GEM 10 is towed along its longitudinal axis during balloon launch operations.

Figure 5A:
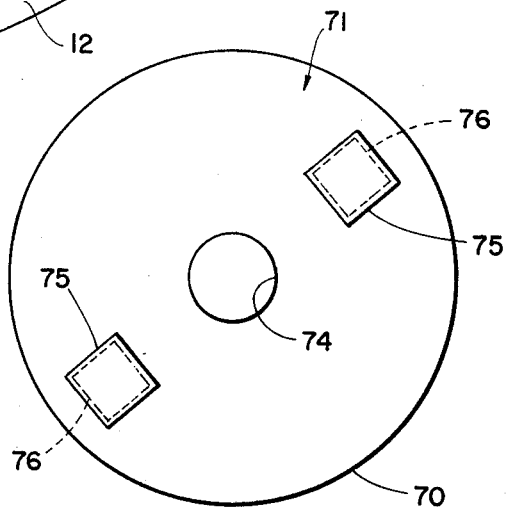
FIGS. 5a and 5b are views of an apparatus of the present invention having improved omni-directional capabilities.
Figure 5B:
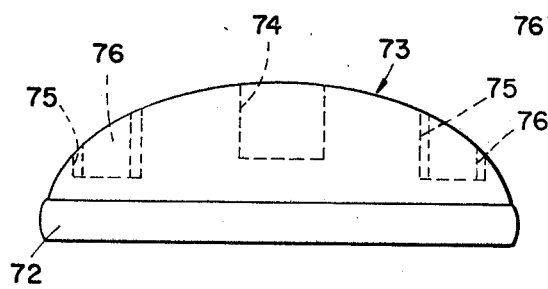

As an alternative to the GEM 10 shown in FIGS. 1-4, a preferred embodiment of a GEM which provides a maximum omni-directional launching capability is shown in FIGS. 5a and 5b as including a GEM 70 having a body 71 provided with a generally circular configuration viewed from the bottom (FIG. 5a) thereof. A flexible skirt 72 extending around the periphery of the body 71 permits the GEM 70 to pass over obstacles of approximately the height of the skirt, and thus permits the GEM 70 to hover with an actual ground clearance of only a fraction of an inch. This small clearance minimizes power requirements for maintaining the air cushion and assists in avoiding the creation of undesirable dust clouds by the efflux of air from beneath the GEM 70.

The body 71 includes a peripherally curved superstructure 73 provided with a payload receptacle 74 similar to the receptacle 20, and wells 75 for receiving fan and engine units 76 which propel the GEM 70. Because the GEM 70 is omni-directional, the curved surface of the superstructure 73 may function as a guide structure on which the connecting line 29 may ride. The line 29 may engage the payload 50 above the center of gravity of the GEM 70 so that a lateral force exerted on the line 29 causes the GEM 70 to tip and accelerate toward the lateral force in the same manner as described with respect to the GEM 10. However, because of the circular construction of the GEM 70, the GEM 70 is more stable and has less tendency to dig in than the GEM 10. The flexible skirt 72 also assists in alleviating the tendency to "dig-in."

Since the GEM's 10 and 70 are capable of travel over terrain that is generally rough, wet or otherwise unsuited for rapid travel by wheeled or tracked vehicles, balloon launching can be accomplished with the present invention with substantially less regard for wind direction and terrain than has been possible before. Furthermore, since the presence of an operator is not required in the GEM's 10 and 70 during the actual launching, the GEM's can move as rapidly as required without endangering operating personnel.

What is claimed is:

1. Apparatus for launching from a surface a balloon and payload connected thereto by an elongated line, comprising:

a ground effect machine elevatable from the surface on a layer of fluid and horizontally movable over said surface in response to small lateral forces, support means on said machine for receiving said payload before launching and restraining lateral movement thereof but permitting vertical release of the payload from the machine, guide means on the machine for receiving and guiding said connecting line for other than vertical movements, means for restraining said balloon at a position horizontally displaced from said machine and releasing the balloon for vertical ascent from said displaced position, whereby as said balloon ascends from the surface a transverse force is transmitted by said connecting line from the balloon to said machine, horizontally displacing said machine in a direction toward and beneath said ascending balloon until the ascent of the balloon vertically lifts the payload from the machine.

2. Apparatus according to claim 1, wherein:
said guide means is configured to restrain horizontal movement of said connecting line relative to a predetermined axis of said ground-effect machine while allowing the connecting line to move freely in a generally vertical direction with respect to the ground-effect machine.

3. Apparatus according to claim 1, wherein:

said support means is positioned generally in alignment with the center of gravity of said ground-effect machine; and means are provided on said ground-effect machine for restraining horizontal movement of the payload along at least one axis of said ground-effect machine so that a generally horizontal force applied to the payload through the connecting line is imparted to said ground-effect machine to produce movement thereof in the direction of said horizontal force;

said restraining means are effective to permit the payload to be lifted substantially vertically from said support means upon application of a vertical lifting force to the payload through said connecting line.

4. Apparatus according to claim 3, wherein:

said guide means comprises a pair of generally upright, spaced apart members fixedly carried by said ground-effect machine at a location horizontally displaced from the center of gravity thereof; and each of said upright members is tilted symmetrically with respect to a vertical plane passing through said one axis to provide a generally V-shaped guide through which said connecting line extends.

5. Apparatus according to claim 3, wherein:

means responsive to said lifting of said payload vertically from said support means are provided for retarding said horizontal movement of said ground-effect machine.

6. The method of launching a balloon-borne payload which comprises the steps of:

providing a ground-effect machine for presenting a temporary payload support spaced from a launching surface;

positioning the payload on the ground-effect machine;

restraining lateral movement of the payload while permitting vertical movement of the payload relative to the ground-effect machine;

positioning the balloon at a location spaced laterally from the ground-effect machine;

providing a connection between the payload and the balloon;

rendering the ground-effect machine operative so that the ground-effect machine and the payload supported thereon are raised out of physical engagement with the launching surface;

inflating the balloon to provide a desired lifting force;

releasing the balloon to permit the balloon to ascend; and releasing the ground-effect machine for lateral movement in response to a lateral component of the lifting force transmitted through the connection to the payload, said restraining of said payload being effective to cause lateral movement of the ground-effect machine along a path tending to position the ground-effect machine and the payload supported thereon substantially beneath the balloon when the balloon has ascended sufficiently to cause the connection to be generally vertical.

7. The method according to claim 6, comprising the further steps of:

providing the connection between the payload and the balloon above the center of gravity of the ground-effect machine so that the restraining of the lateral movement of the payload relative to the ground-effect machine results in tipping of the ground-effect machine at an angle relative to said surface, said tipping causing a ground-effect machine force in addition to said lateral force for moving said ground-effect machine and payload to said position.

8. The method according to claim 6, comprising the further step of:

inhibiting further movement of the ground-effect machine immediately following lifting of the payload from the ground-effect machine by the balloon.

9. The method according to claim 7, comprising the further step of:

restraining lateral movement of said ground-effect machine upon said connection assuming said generally vertical position.

References Cited

UNITED STATES PATENTS

| | | | |
|---|---|---|---|
| 2,829,846 | 4/1958 | Keiper | 244—23 |
| 2,865,581 | 12/1958 | Froehlich | 244—31 X |
| 3,081,967 | 3/1963 | Church | 244—31 |
| 3,117,643 | 1/1964 | Cockerell | 244—23 X |
| 3,128,970 | 4/1964 | Tinajero et al. | 244—23 X |

MILTON BUCHLER, Primary Examiner

R. A. DORNON, Assistant Examiner

U.S. Cl. X.R.

180—116